(12) United States Patent
Masukawa (10) Patent No.: US 9,019,395 B2
(45) Date of Patent: Apr. 28, 2015

(54) IMAGE MANAGEMENT APPARATUS AND CONTROL METHOD THEREOF FOR LAYING OUT AN IMAGE SHOOTING LOCATION ON A MAP

(71) Applicant: Canon Kabushiki Kaisha, Tokyo (JP)

(72) Inventor: Akihiro Masukawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/751,197

(22) Filed: Jan. 28, 2013

(65) Prior Publication Data

US 2013/0201352 A1   Aug. 8, 2013

(30) Foreign Application Priority Data

Feb. 6, 2012   (JP) .................... 2012-023505

(51) Int. Cl.
*H04N 5/76* (2006.01)
*G06T 3/40* (2006.01)
*G06T 11/60* (2006.01)
*G09B 29/00* (2006.01)

(52) U.S. Cl.
CPC . *G06T 3/40* (2013.01); *G06T 11/60* (2013.01); *G09B 29/00* (2013.01)

(58) Field of Classification Search
USPC ................ 348/333.5–333.12, 231.2
See application file for complete search history.

(56) References Cited

U.S. PATENT DOCUMENTS

| | | | |
|---|---|---|---|
| 2003/0208316 A1* | 11/2003 | Endo et al. ................. | 701/211 |
| 2007/0233373 A1* | 10/2007 | Choi et al. ................. | 701/209 |
| 2011/0050732 A1* | 3/2011 | Arrasvuori .................. | 345/666 |
| 2012/0310526 A1* | 12/2012 | Mizuno et al. ............. | 701/424 |
| 2013/0339891 A1* | 12/2013 | Blumenberg et al. ...... | 715/771 |
| 2014/0141811 A1* | 5/2014 | Kawazoe ................... | 455/456.3 |

FOREIGN PATENT DOCUMENTS

JP   2010-086039 A   4/2010

* cited by examiner

*Primary Examiner* — Mekonnen Dagnew
(74) *Attorney, Agent, or Firm* — Carter, DeLuca, Farrell & Schmidt, LLP (57) ABSTRACT

An image management apparatus for managing an image, to which position information indicative of an image shooting location is appended, comprises a transmission unit configured to transmit map data corresponding to the position information to an information processing apparatus, and an identification unit configured to identify a user of the information processing apparatus, the transmission unit transmits, to the information processing apparatus, map data with a different scale in accordance with the user identified by the identification unit.

9 Claims, 5 Drawing Sheets

| IMAGE ID | PATH OF IMAGE FILE | PATH OF THUMBNAIL | IMAGE SHOOTING DATE AND TIME | LATITUDE | LONGITUDE |
|---|---|---|---|---|---|
| ... | | | | | |
| 9901 | /img0001/AXYJ01298.jpg | /thm0001/AXYJ01298.jpg | 2010/3/5 | 45.433333 | 12.340833 |
| 9902 | /img0001/ZnrEk85231.jpg | /thm0001/ZnrEk85231.jpg | 2010/3/5 | 45.435916 | 12.3386 |
| 9903 | /img0001/cVmoP60193.jpg | /thm0001/cVmoP60193.jpg | 2010/3/5 | 45.435916 | 12.3386 |
| ... | | | | | |

F I G. 4B

402

| ALBUM ID | USER ID | SHARED URL | SHARE FLAG | NUMBER OF IMAGES | IMAGE ID | CENTRAL LATITUDE | CENTRAL LONGITUDE | SCALE | MAP STORAGE FLAG |
|---|---|---|---|---|---|---|---|---|---|
| ... | | | | | | | | | |
| 12357 | 150 | /150/IYulq34578 | 1 | 30 | 9901,9902,... | 45.434471 | 12.33961 | 4 | 1 |
| 12358 | 209 | /209/tbNMg92401 | 1 | 25 | 9931,9932,... | | | | 0 |
| 12361 | 53 | /53/BcpRk29614 | 0 | 10 | 10059,10060,... | 35.454361 | 139.63136 | 2 | 0 |
| ... | | | | | | | | | |

IMAGE MANAGEMENT APPARATUS AND CONTROL METHOD THEREOF FOR LAYING OUT AN IMAGE SHOOTING LOCATION ON A MAP

BACKGROUND OF THE INVENTION

1. Field of the Invention

The present invention relates to an image management technique for laying out an image shooting location on a map.

2. Description of the Related Art

Conventionally there has been a technique for recording an image, shot by a digital camera incorporating a GPS function, along with an image shooting location, and displaying the shooting location on a map (For instance, Japanese Patent Laid-Open No. 2010-086039).

When the image shooting location is to be displayed on a map, because a photographer of the image has visited the neighborhood of the shooting location for shooting the image, he/she wants to view the map with an enlarged scale, for instance, when he/she needs to confirm the neighborhood geography in detail. On the other hand, for a person other than the photographer who does not know the shooting location at all, if the person views the large-scale map first, he/she cannot have a clue as to where the location is. Therefore, for a user other than the photographer, it is preferable to reduce the map scale and display a wide area.

SUMMARY OF THE INVENTION

The present invention has been made in consideration of the aforementioned problem, and realizes an image management technique that displays a map with an appropriate scale in accordance with a viewer when an image shooting location is displayed on a map, so that the viewer can easily recognize the image shooting location on the map.

In order to solve the aforementioned problem, the present invention provides an image management apparatus for managing an image, to which position information indicative of an image shooting location is appended, comprising: a transmission unit configured to transmit map data corresponding to the position information to an information processing apparatus; and an identification unit configured to identify a user of the information processing apparatus, wherein the transmission unit transmits, to the information processing apparatus, map data with a different scale in accordance with the user identified by the identification unit.

In order to solve the aforementioned problem, the present invention provides a control method of an image management apparatus for managing an image, to which position information indicative of an image shooting location is appended, comprising the steps of: receiving an access from an information processing apparatus; identifying a user of the information processing apparatus based on the access; and transmitting, to the information processing apparatus, map data with a different scale in accordance with the identified user.

According to the present invention, it is possible to display a map with an appropriate scale in accordance with a viewer so as to help the viewer easily recognize a shooting location on the map.

Further features of the present invention will become apparent from the following description of exemplary embodiments with reference to the attached drawings.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be suitably combined.

Described hereinafter is an embodiment that realizes an image management apparatus according to the present invention by a server computer of, for instance, an on-line album site, and realizes a map management apparatus according to the present invention by a server computer of, for instance, a map data service site providing map data.

<System Configuration>

First, a configuration of an image management apparatus according to the embodiment of the present invention, and a system configuration including the image management apparatus, a map management apparatus, and user PCs are described with reference to FIGS. 1 and 2.

Figure 2:
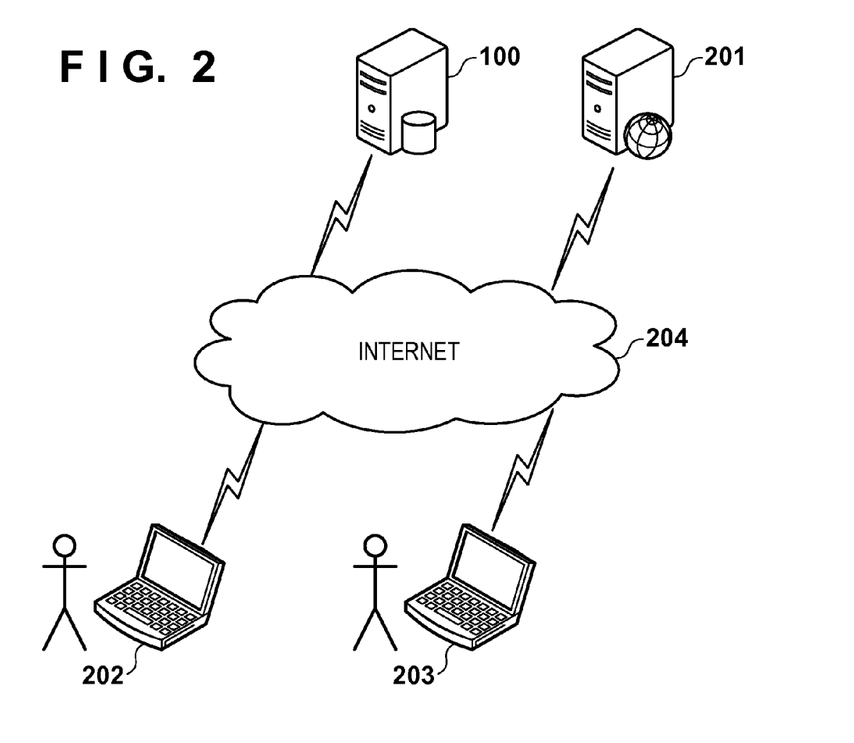
FIG. 2 is a view showing a system configuration including an image management apparatus according to the present embodiment, a map management apparatus, and user PCs.

In FIG. 2, the system according to the present embodiment comprises an image management system 100, a map management apparatus 201, and PCs 202 and 203.

The map management apparatus 201 holds world map data with various scales, and provide the image management apparatus 100 with the world map data. The image management apparatus 100 transmits information such as latitude, longitude, a scale, a size of a display area and so forth, to the map management apparatus 201 through the Internet 204, and acquires corresponding map data. Note that the Internet 204 may be of another network, such as a Local Area Network (LAN), or may be configured by a public line network.

The PCs 202 and 203 are personal computers used by a user, such as a photographer, a guest user, or the like. The PC 202 or 203 starts up a Web browser and accesses a Web page, which is generated by the image management apparatus 100, through the Internet 204. Assume herein that the PC 202 is operated by a photographer, while the PC 203 is operated by a guest user.

The photographer's PC 202 accesses a Web page of the image management apparatus 100 and uploads images, shot by the photographer, to the image management apparatus 100. The image management apparatus 100 organizes the images by sorting the stored images into a plurality of albums in accordance with an instruction from the photographer's PC 202, and notifies authorized guest users, by an electronic mail or the like, of a shared URL that can be used for accessing the album in accordance with an instruction from the photographer's PC 202. The notified guest user's PC 203 accesses a Web page corresponding to the notified shared URL, acquires an image included in the album, and displays the image on a screen.

<Apparatus Configuration>

Figure 1:
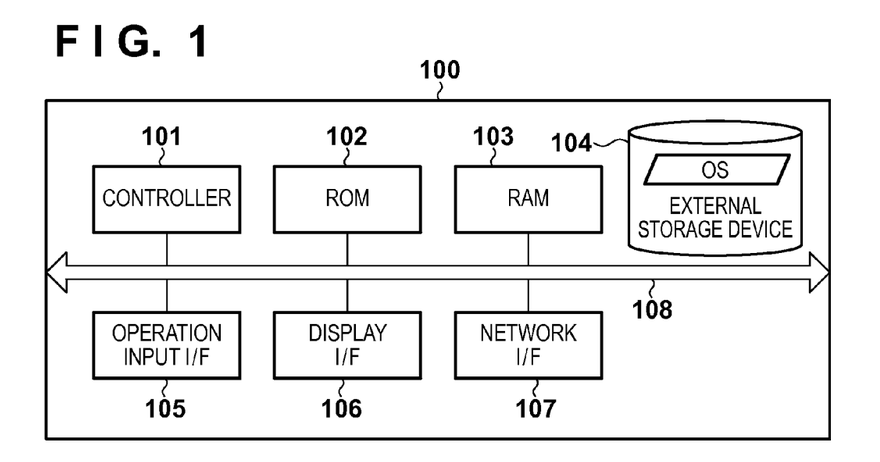
FIG. 1 is a block diagram showing a configuration of an image management apparatus according to an embodiment of the present invention.

FIG. 1 exemplifies a configuration of a computer apparatus that realizes an information processing apparatus, such as the image management apparatus 100, map management apparatus 201, PCs 202 and 203 or the like which constitute the system of the present embodiment.

In FIG. 1, a controller 101 controls the overall computer apparatus. The controller 101 is, for instance, a CPU (Central Processing Unit). A ROM 102 is a non-volatile memory storing programs and parameters that do not require changes. A RAM 103 is a volatile memory that temporarily stores programs and data supplied from an external apparatus or the like. An external storage device 104 is a storage device including a hard disk or memory card fixed to an apparatus, a magnetic or optical disk such as a floppy disk (registered trademark) attachable to or detachable from an apparatus, MO, CD/DVD, USB memory or the like, a magnetic or optical card, an IC card, and so forth. An interface 105 receives operation of an administrator of the computer apparatus. The interface 105 includes an input device, such as a pointing device and a keyboard for inputting data. An interface 106 interfaces a display for displaying data stored in the computer apparatus or supplied data. A network interface 107 is provided for connection with a network line, such as the Internet. A system bus 108 communicably connects each of the units 101 to 107.

The controller 101 reads an OS and various application programs from the ROM 102, RAM 103, or external storage device 104, starts up the programs, and executes processing that will be described below.

Note that, in the external storage device 104 of the image management apparatus 100, an image file uploaded from the photographer's PC 202 is stored in association with an album. In the external storage device 104 of the map management apparatus 201, world map data with a plurality of scales are stored. In the external storage device 104 of the photographer's PC 202, an image file inputted from an image capturing apparatus, such as a digital camera, is stored.

In the external storage device 104 of the image management apparatus 100, an image management application software program is stored. In the external storage device 104 of the map management apparatus 201, a map management application software program is stored. Each external storage device 104 of the PCs 202 and 203 has a Web browser program.

<Screen Display Example>

Figure 3:
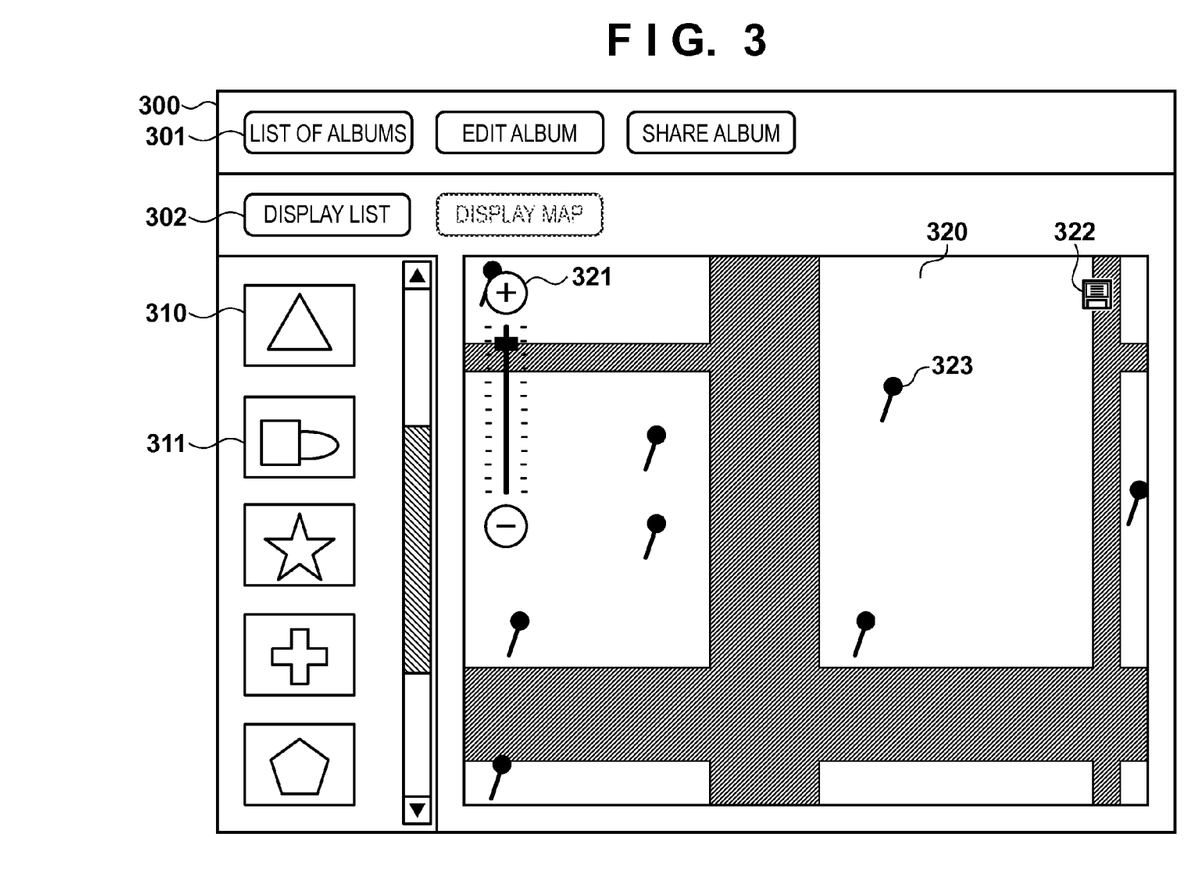
FIG. 3 is an exemplified view of a Web page generated by the image management apparatus according to the present embodiment, which is displayed by a Web browser.

FIG. 3 exemplifies a screen that displays, by a Web browser, a Web page generated by the image management apparatus 100 according to the present embodiment, which is displayed in the window of the Web browser of the photographer's PC 202.

In FIG. 3, buttons 301 are provided for instructing operation regarding an album. For instance, when a photographer clicks the "share album" button, the image management apparatus 100 changes the display of the album to a state that authorizes the image display to a guest user, and distributes electronic mail to the guest user to notify a shared URL that can be used for accessing the album.

Buttons 302 are provided for selecting an image display method. When the photographer selects the "display map" button, the image management apparatus 100 acquires shooting locations of a plurality of image files to be displayed that are included in the album, and displays the shooting locations on the map as shown in FIG. 3.

Areas 310 are provided for displaying thumbnails 311 of images included in the album.

An area 320 is provided for displaying a map corresponding to the album. Position information appended to an image in the album is displayed as a marker 323 on the map. Note that, if there is no image to which a shooting location is appended, no map is displayed.

A controller 321 is provided for changing the scale of the map displayed on the map display area 320.

A button 322 is provided for instructing the apparatus to store the range of the map, which is currently displayed in the map display area 320, in association with the album. This is used as an initial value of the map range, when the map data is displayed on the guest user's PC 203. Also, it is used as an initial value next time the photographer's PC 202 displays the same album on the map.

When a user selects the "display list" button 302, the thumbnail display area 310 expands, while the map display area 320 is not displayed.

Figure 6:
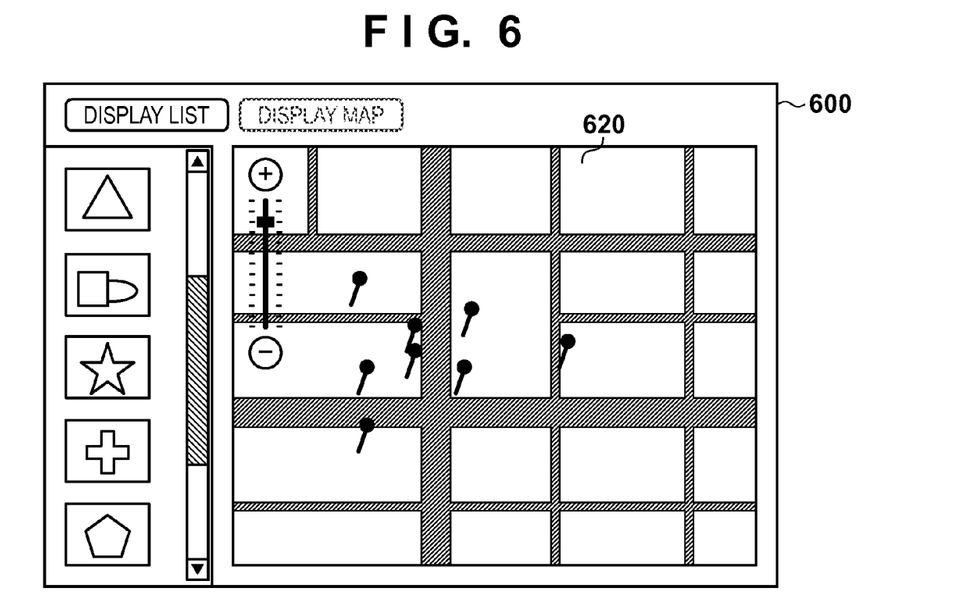
FIG. 6 is an exemplified view of a Web page generated by the image management apparatus according to the present embodiment, which is displayed by a Web browser.

FIG. 6 exemplifies a screen 600 that is displayed in the window of the Web browser of the guest user's PC 203.

Compared to the map display area 320 of the screen 300 in FIG. 3, the scale of the map display area 620 of the screen 600 has a smaller value, and thus a wider area is displayed. Note that the buttons such as "edit album", "share album", "list of albums" and the like that are shown on the screen 300 are not displayed on the screen 600.

Figure 4A:
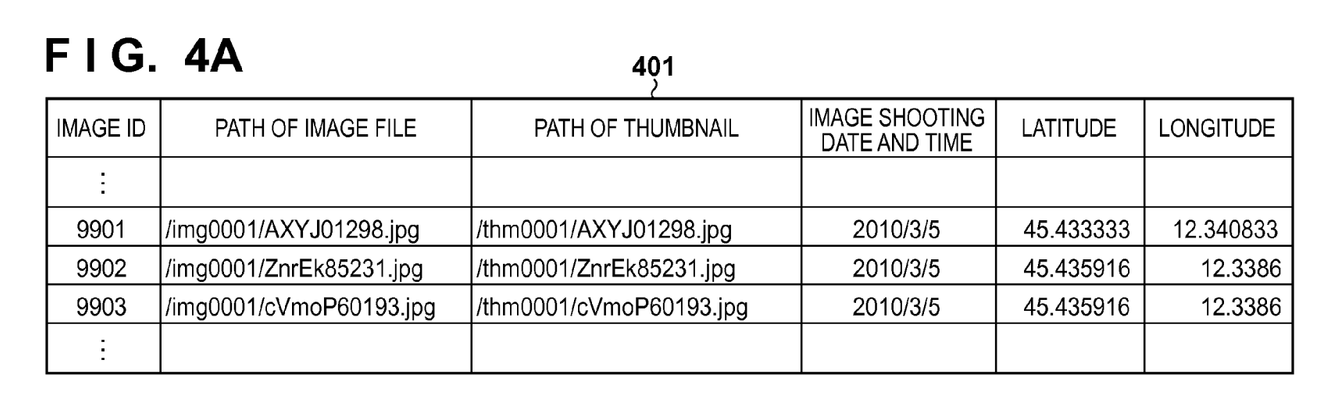
FIGS. 4A and 4B are exemplified views of database, referred by the image management apparatus according to the present embodiment for managing images and albums.
Figure 4B:
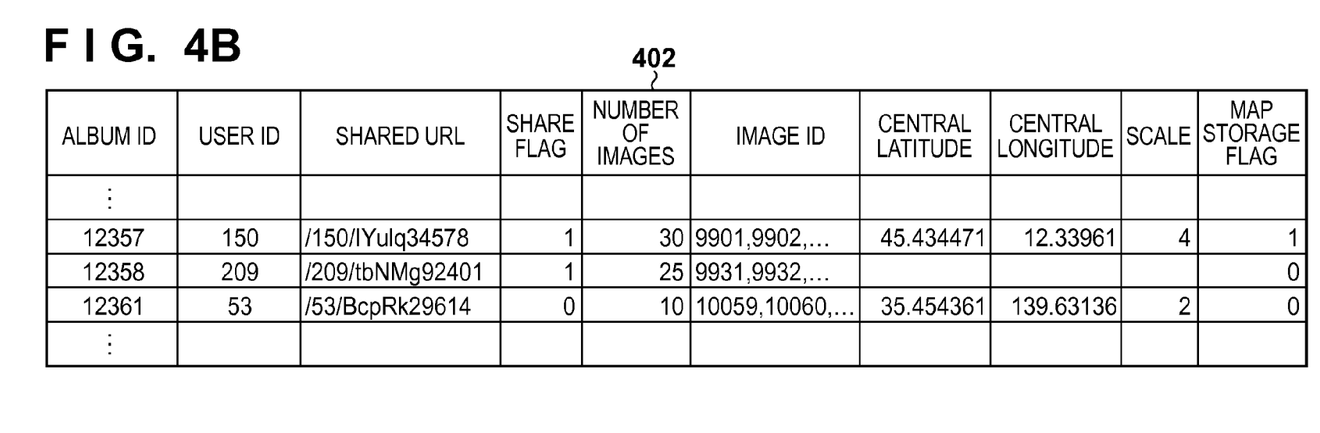

FIGS. 4A and 4B are tables showing part of a database used by the image management apparatus 100 according to the present embodiment for classifying image files into albums.

FIG. 4A is a table showing part of a database 401 used for managing images by the image management apparatus 100. The image management apparatus 100 stores, in units of image, information such as a path of a stored image file and a path of a thumbnail generated based on the image.

In a case of an image shot by a camera comprising a GPS function, which holds position information as meta data, the image management apparatus 100 extracts the latitude and longitude information from the image and stores the information as a shooting location.

FIG. 4B is a table showing part of a database 402 used for managing albums by the image management apparatus 100.

The image management apparatus 100 stores, in units of album, information regarding the album in the database 402. The database 402 stores information, such as a share flag indicative of whether or not image display to a guest user is authorized, a shared URL that is used when a guest user's PC 203 accesses an album using a Web browser, and the like. In the present embodiment, assume that, when image display to a guest user is authorized, the value of the share flag is set to 1. The image management apparatus 100 also stores, in the database 402, an album ID that uniquely identifies an album, a user ID that uniquely identifies an album owner, the number of images that belong to the album, and an image ID uniquely given to images that belong to the album. Note that the present embodiment describes a case in which an album includes images shot by one photographer, and the photographer is the album owner. However, an album may include images shot by a plurality of photographers. In this case, one of them becomes an album owner on behalf of the plurality of photographers. Furthermore, there is a case that a user, to whom an image shot by a photographer is given, uploads the image and becomes the album owner. Therefore, even if a photographer who will be described later is substituted by an album owner, the present invention can similarly be realized.

When the image management apparatus 100 generates a Web page including map data, the latitude and longitude of the center position as well as the scale are stored as necessary in the database 402 as the information of the map range to be displayed. The scale is stored as a level value: for instance, 1/750 is 1, 1/1500 is 2, 1/3000 is 3, 1/6000 is 4, and so on in order from the larger scale. Also, the image management apparatus 100 stores, in the database 402, a flag indicative of whether a photographer has instructed to store the map range. When the photographer's PC 202 instructs to store the map range, the image management apparatus 100 writes information regarding the map range at this point in the album management database 402, and sets the map storage flag to 1.

<Map-Data Scale Change Processing>

Figure 5:
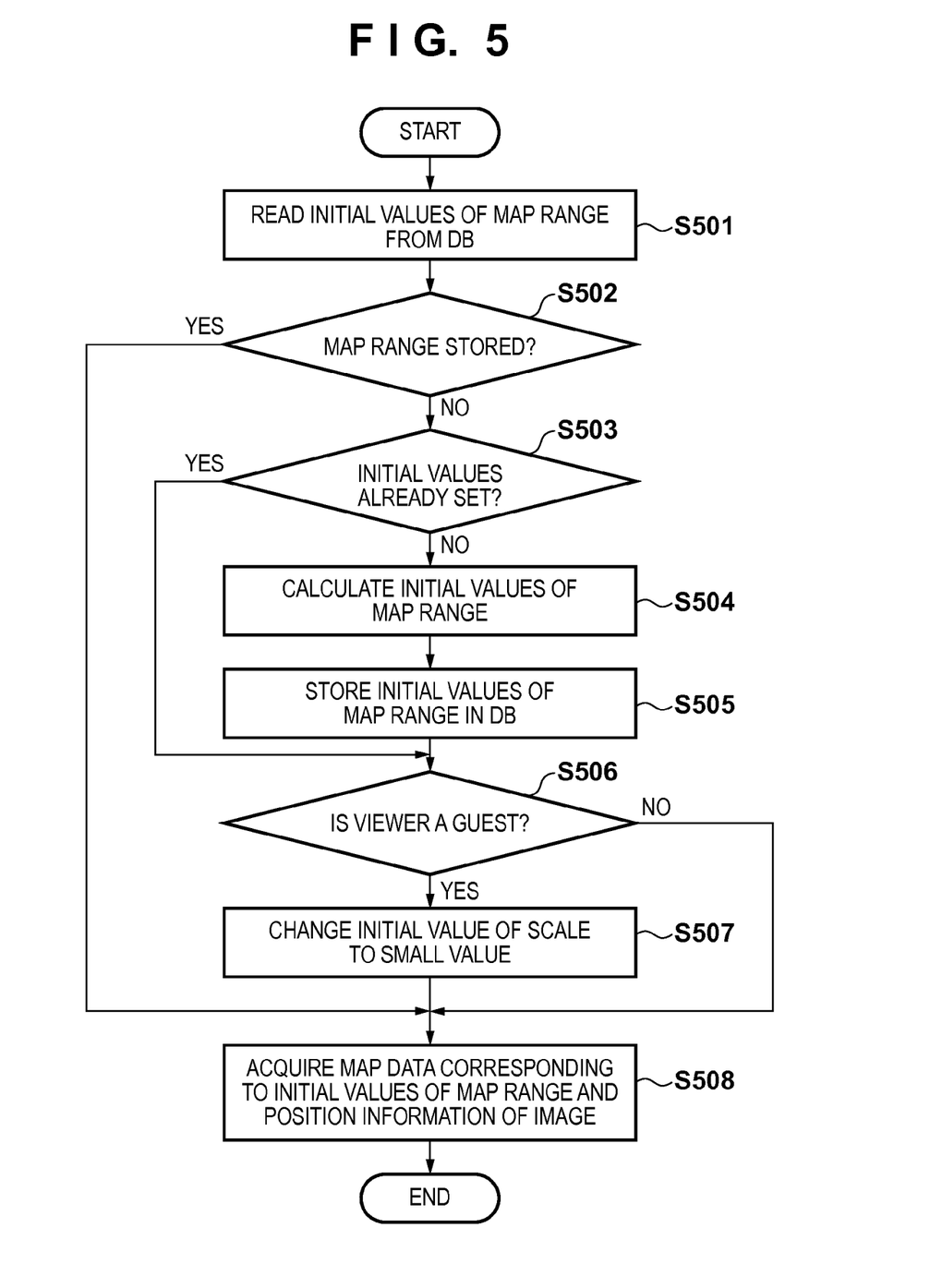
FIG. 5 is a flowchart describing operation of the image management apparatus according to the present embodiment.

FIG. 5 shows processing for changing a map-data scale, which is performed by the image management apparatus 100. Note that the processing in FIG. 5 is realized by reading an OS and an image management application software program from the external storage device 104 and executing the program by the controller 101 of the image management apparatus 100.

In FIG. 5, the image management apparatus 100 receives a supply request for an album's map from the PC 202 or PC 203 through the network.

In step S501, the image management apparatus 100 reads, as initial values of the map range, the latitude and longitude of the center position as well as the scale stored in the album management database 402. In the example of album ID 12357 in FIG. 4B, the latitude is 45.434471, the longitude is 12.33961, and the scale is 4. In the example of album ID 12358, because the central latitude and longitude, and the scale are not stored, the initial values are left unset.

In step S502, the image management apparatus 100 refers to the map storage flag in the album management database 402 to determine whether the map range is stored. In the example of album ID 12358, because the value of the map storage flag is 0, the apparatus determines that the map range is not stored.

If it is determined in step S502 that the map range is stored, the processing goes to step S508 that will be described later.

Meanwhile, if it is determined in step S502 that the map range is not stored, the image management apparatus 100 determines in step S503 whether initial values of the map range have already been set. In the example of album ID 12358, because initial values are not set in step S501 as mentioned above, it is determined that initial values of the map range have not been set.

If it is determined in step S503 that initial values of the map range have already been set, the processing goes to step S506 that will be described later.

If it is determined in step S503 that the map range has not been set, the image management apparatus 100 calculates initial values of the map range in step S504.

The image management apparatus 100 refers to information corresponding to the image ID of the album management database 402, and reads from the image management database 401 the latitude and longitude information of all images in the album holding position information. For initial values of the map range, for instance, the center of the map may be obtained by calculating the latitude and longitude corresponding to the center based on the positions of all images. For the scale, a maximum value that allows all positions to fit in the map display area 320 is obtained. Alternatively, for the scale, a predetermined fixed value may be adopted.

In step S505, the image management apparatus 100 stores the initial values of the map range, which have been calculated in step S504, in the fields of the central latitude, central longitude, and scale of the album management database 402.

In step S506, the image management apparatus 100 refers to the shared URL of the album management database 402 to determine whether the shared URL coheres with the URL used for the access, in other words, whether the viewer is a guest user. If the URL used for the access coheres with the shared URL, the image management apparatus 100 determines the viewer as a guest user. Note that the photographer's PC 202 first accesses the image management apparatus 100 by using an album list URL of a Web page showing a list of a plurality of albums. Thereafter, the PC 202 accesses the Web page of the album in the image management apparatus 100 by using an album URL that is linked to the album selected from the plurality of albums. Therefore, if the viewer is a photographer, and not a guest user, the access URL does not cohere with the shared URL.

If it is determined in step S506 that the access is not from the guest PC 203, the processing goes to step S508 that will be described later.

If it is determined in step S506 that the access is from the guest PC 203, then in step S507, the image management apparatus 100 multiplies the initial value of the scale by a constant rate to change the scale to a smaller value.

Assuming a case where the constant rate is ½, scale level 2 (1/1500) is changed to 1/3000, in other words, it is changed to level 3 that is a small scale value. For another method of changing the scale to a small scale value, the scale may be lowered by a constant level. For instance, assuming that the constant level is 2, scale level 2 (1/1500) is changed to level 4 (1/6000) that is a small scale value. In any method, if a changed scale value becomes smaller than a predetermined value, the scale is changed to a smaller value of either an initial value before the change or a predetermined value. This is precaution against an overly wide-area map.

Alternatively, there is another method that, if the initial value of the scale is larger than the predetermined value, the scale may always be changed to the predetermined value.

By virtue of this feature, in a case where a photographer has not instructed to store the map range, the initial value of the scale used by a guest user for viewing the map becomes smaller than an initial value used by the photographer for viewing the map. Therefore, the guest user does not have to view an overly detailed map.

In step S508, the image management apparatus 100 transmits the initial value of the map range, the latitude and longitude of all images in the album, and the size of the map display area 320 to the map management apparatus 201, and acquires corresponding map data from the map management apparatus 201. To this map data, markers 323 are appended in the positions corresponding to the latitude and longitude of the image shooting locations.

The image management apparatus 100 generates a Web page by adding, to the map data acquired in accordance with the flowchart in FIG. 5, the controllers 301, 302, 321 and 322, thumbnail display area 310, and the like.

After the map is initially displayed, not only the photographer but also a guest user can change the map to a desired scale by operating the controller 321. More specifically, the image management apparatus 100 receives a scale change instruction from the guest PC 203, acquires map data corresponding to the new scale from the map management apparatus 201, and provides the guest PC 203 with the map data. It is possible to set an upper limit on the changeable scale, in case of a request from the guest PC 203. By virtue of the upper limit, details of the shooting location become difficult to view, and the photographer's privacy can be protected.

By distributing a Web page, which describes reading another Web page by a Web browser after the elapse of a predetermined period of time, the image management apparatus 100 can change the scale of the map provided to the guest PC 203 to the same scale as the one provided to the photographer's PC 202 after the elapse of a predetermined period of time. In other words, the screen displayed by the Web browser is changed from the state of FIG. 6 to the state of FIG. 3 after the elapse of a predetermined period of time.

Figure 7:
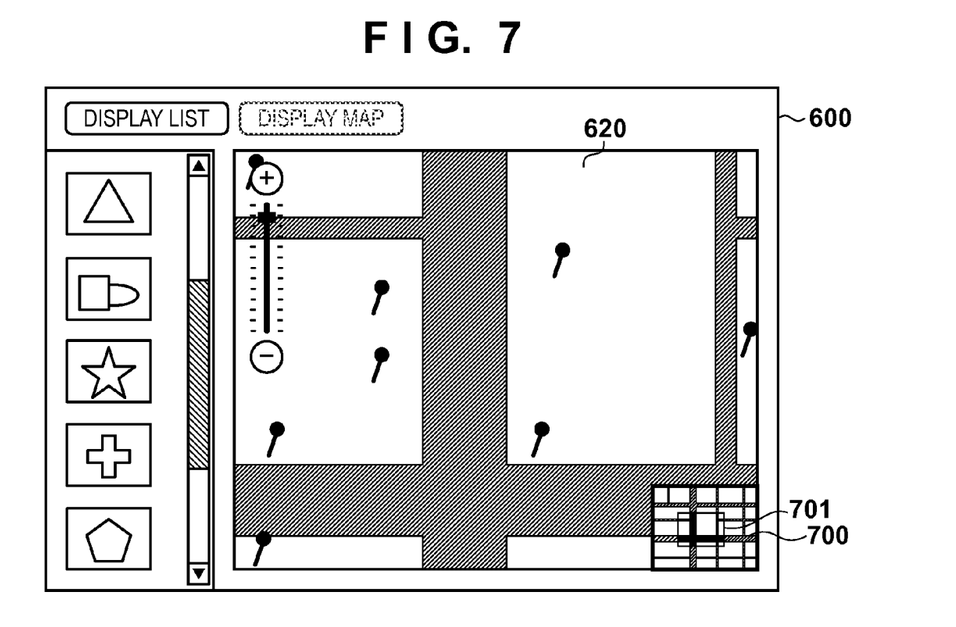
FIG. 7 is an exemplified view of a Web page generated by the image management apparatus according to the present embodiment, which is displayed by a Web browser.

The above embodiment has described a method of providing, to the guest PC 203, a wider area map. There is also a method of auxiliary superimposing a small wide-area map on the map having the same scale as the one provided to the photographer's PC 202. An example is shown in FIG. 7. The map display area 620 mainly shows the map shown in FIG. 3 having the same scale as that of the photographer's map, which is displayed by the Web browser when the photographer views his/her own album.

A map 700 is a wide-area map with a reduced scale. A frame 701 indicates, within the wide-area map 700, the corresponding location of the mainly displayed map area 620.

In aforementioned step S507 in FIG. 5, the scale of the wide-area map 700 is set in the changed small value, and the initial value of the scale of the mainly displayed map is unchanged.

The present embodiment has described a method of changing the scale of a map to be provided in accordance with the type of URL used for the access in step S506. In addition, users other than the photographer may be categorized further by other criteria.

For instance, the embodiment may be configured in a way that, when the image management apparatus 100 receives an access from the PCs 202 and 203, the apparatus 100 receives a user ID for initially performing log-in authorization, identifies the user, and switches the scale in accordance with the user's attribute. More specifically, the image management apparatus 100 acquires, from the database 402, a user ID of the album for which the viewing request has been received, compares the user IDs received from the PCs 202 and 203 with the album user ID, and switches the scale in accordance with the comparison result. If the user IDs received from the PCs 202 and 203 do not match the album owner's user ID, the initial value of the scale is changed to a smaller value than the case where the IDs match. In addition, the photographer stores in advance not only information about himself/herself, but also personal information about guest users in the image management apparatus 100 by categorizing the users into groups, such as family, friends, and so on. The image management apparatus 100 identifies whether the apparatus user who made an access in step S506 is a photographer himself/herself, family, or a friend, and changes the initial value of the scale to a small value if the user is a friend. Alternatively, there is a method of comparing the area displayed on the map with the area of viewer's residence. The photographer stores in advance not only information about himself/herself but also the residence area of guest users as personal information in the image management apparatus 100. The image management apparatus 100 acquires the residence area of the user whose log-in has been authorized, and determines whether the user's residence area is included in a predetermined range from the central position of the image shooting location. Alternatively, the determination may be made by comparing the area displayed on the map with the viewer's residence country, or by making comparison in further detailed area levels (if it is Japan, in the level of prefecture, city, town or the like). If the user's residence area is outside the predetermined range, the initial value of the scale is changed to a small value. If it is a user's residence area, the user is highly likely familiar with the neighborhood geography; therefore, it is more convenient to display a detailed map. Note that, in a case of a photographer, the initial value of the scale may be left as it is in a large value, regardless of the residence area. For determining the user's residence area, there is a method of determining an area based on the IP address of the access originator that has made an access to the Web page.

Note that, although the above-described embodiment has described an example in which the image management apparatus 100 and the map management apparatus 201 are configured as separate units, the image management apparatus 100 may integrally comprise the map management apparatus 201.

As described above, according to the present embodiment, for a guest user who is highly likely unfamiliar with the area displayed on the map, a map with a smaller scale than that of the photographer is displayed. Therefore, a map with an appropriate scale can be displayed in accordance with the viewer.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-023505, filed Feb. 6, 2012, which is hereby incorporated by reference herein in its entirety.

What is claimed is:

1. An image management apparatus for managing an image, to which position information indicative of an image shooting location is appended, the image management apparatus comprising:

a transmission unit configured to transmit map data corresponding to the position information to an information processing apparatus;

an identification unit configured to identify whether a user of the information processing apparatus is a predetermined user who provides an instruction for making the image management apparatus manage the image; and     a setting unit configured to set an initial value of a scale of a map in a way that position information of an image to be displayed all fits in the map,     wherein the transmission unit transmits, to the information processing apparatus, map data with a set scale, and wherein the setting unit sets the initial value so that a scale of map data to be transmitted to the information processing apparatus of which the user is identified as the predetermined user becomes smaller than the scale of map data to be transmitted to the information processing apparatus of which the user is not identified as the predetermined user.

2. The apparatus according to claim 1, further comprising a reception unit configured to receive, from the information processing apparatus, an instruction for changing a scale of a map,
wherein when the instruction for changing the scale of the map is received by the reception unit, the transmission unit transmits, to the information processing apparatus, map data with a scale that corresponds to the instruction regardless of the user of the information processing apparatus.

3. The apparatus according to claim 1,
wherein the identification unit identifies whether the user of the information processing apparatus is the predetermined user, and
wherein the image management apparatus manages an image uploaded from an information processing apparatus of the predetermined user.

4. The apparatus according to claim 1, further comprising a reception unit configured to receive, from the information processing apparatus, a request signal for requesting map data,
wherein the identification unit identifies the user of the information processing apparatus based on the request signal received by the reception unit.

5. The apparatus according to claim 1, wherein the identification unit identifies the user of the information processing apparatus based on an IP address corresponding to the information processing apparatus.

6. The apparatus according to claim 1, wherein the identification unit identifies the user of the information processing apparatus based on a user ID transmitted by the information processing apparatus.

7. The apparatus according to claim 1, further comprising a display control unit configured to display both an image to be managed and a map that corresponds to map data.

8. A control method of an image management apparatus for managing an image, to which position information indicative of an image shooting location is appended, the control method comprising:
receiving access from an information processing apparatus;
identifying whether a predetermined user of the information processing apparatus is a user who provides an instruction for making the image management apparatus manage the image;
setting an initial value of a scale of a map in a way that position information of an image to be displayed all fits in the map; and
transmitting, to the information processing apparatus, map data with a set scale,
wherein the initial value is set so that a scale of map data to be transmitted to the information processing apparatus of which the user is identified as the predetermined user becomes smaller than the scale of map data to be transmitted to the information processing apparatus of which the user is not identified as the predetermined user.

9. A non-transitory computer-readable storage medium storing a program for causing a computer to execute the control method according to claim 8.

* * * * *